Feb. 10, 1970  W. E. LE MAY  3,494,989
METHOD FOR PRODUCING PLASTIC ARTICLE
Filed May 31, 1968

INVENTOR.
WILLIAM E. LE MAY
BY Dybvig and Dybvig
HIS ATTORNEYS 3,494,989
METHOD FOR PRODUCING PLASTIC ARTICLE
William E. LeMay, Dayton, Ohio, assignor, by mesne assignments, to Baxter Laboratories, Inc., Morton Grove, Ill., a corporation of Delaware
Continuation-in-part of application Ser. No. 466,586, June 24, 1965. This application May 31, 1968, Ser. No. 737,255
Int. Cl. B29c *13/00;* B29d *31/00;* A61b *19/04*
U.S. Cl. 264—45                               4 Claims

ABSTRACT OF THE DISCLOSURE

A method for producing molded articles of a hollow nature having an inner lamina of a synthetic resin and an outer lamina of a synthetic resin wherein the outer lamina has contained in it a plurality of cellular voids due to the inclusion of a blowing agent in a small quantity so that the cellular voids are relatively few in number as compared to a conventional foamed synthetic resin material.

---

The present application is a continuation-in-part of applicant's application Ser. No. 466,586 filed June 24, 1965 for Method for Producing Plastic Article, said application Ser. No. 466,586 being a division of abandoned application Ser. No. 375,748 filed June 17, 1964 for Molded Plastic Article and Method for Producing Same.

This invention relates to a method for producing a plastic article having a roughened or textured surface. The invention is conveniently described by reference to its application to the manufacture of protective gloves and particularly sanitary gloves. A protective glove is desirably fabricated from a flexible sheet material which is impervious to liquids. It is also preferable that the external surface of the sheet material have a rough and non-tacky texture so that the glove will have good traction with objects being handled by the user. Various techniques, such as the introduction of a gritty substance into the sheet material of which the glove is fabricated have been employed in the past to produce a roughened outer surface for the glove. However, such techniques introduce a number of disadvantages especially when the glove is to be used as a sanitary glove. The more obvious disadvantages are a tendency of the gritty substance to weaken the glove so that it ruptures too easily. Also the gritty substances are found to introduce a porosity into the glove with the result that the glove readily picks up and retains contaminating substances during use.

An object of the present invention is to provide an improved method of dip molding articles wherein articles of substantially uniform thickness are produced.

Another object of the present invention is to provide an improved method of fabricating molded plastic articles with a roughened or textured surface.

Still another object of the present invention is to provide an improved process for manufacturing hollow plastic articles, such as gloves, with two layers of plastic material, one layer being a solid layer of substantial structural strength and the other layer having a roughened or textured surface.

Other objects and advantages reside in the composition of the molded layers, the method of manufacture and the mode of operation, as will become more apparent from the following description.

In the preferred practice of the present invention, the molded article or glove is produced by two successive molding operations. In the first operation, a substantially smooth and non-porous metallic mandrel 10 having the general shape of a hand is dipped into a creamy plastisol 12 residing in a suitable container 14, is withdrawn from the plastisol, and then supported above the container 14 to permit excess plastisol to drip off the mandrel into the container. The plastisol 12 is free of any entrapped air or any agent capable of releasing volatile matter on heating, so that the coating 16 may be cured to a solid and stable film.

Figure 1:
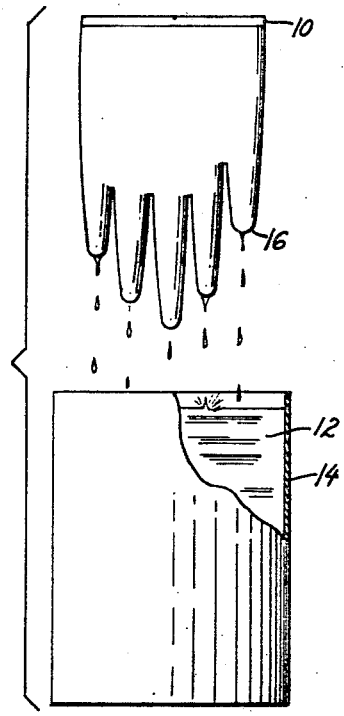
FIGURE 1 is an elevation view with a part broken away illustrating a first dipping step employed in the present invention.
Figure 2:
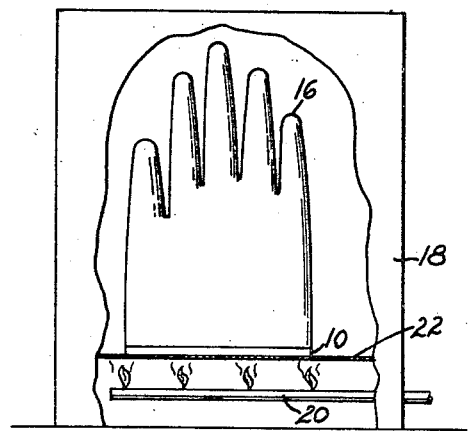
FIGURE 2 is an elevation view with a part broken away illustrating a first heating step employed in the present invention.
Figure 3:
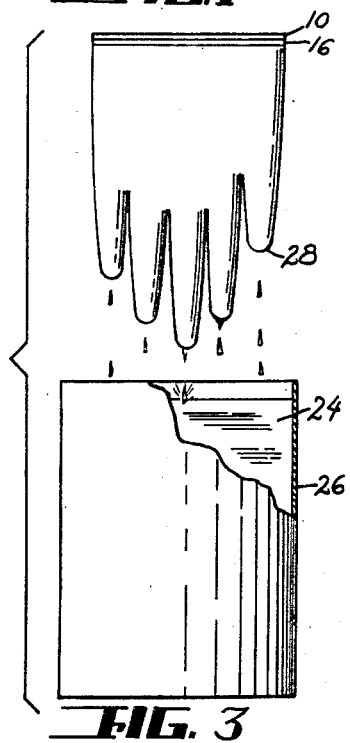
FIGURE 3 is an elevational view with a portion broken away illustrating a second dipping step employed in the present invention.
Figure 4:
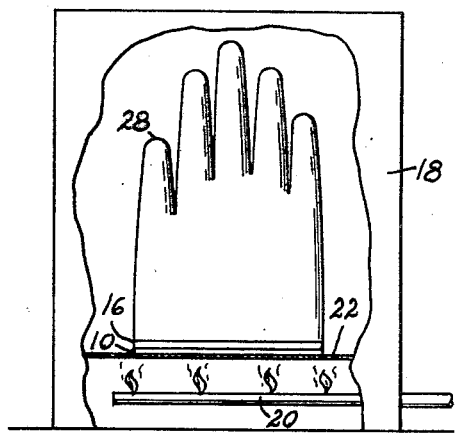
FIGURE 4 is an elevational view with a part broken away illustrating a second heating step employed in the present invention.

After substantially all excess has run off the mandrel 10, the mandrel is inverted and placed in an oven 18 as illustrated in FIGURE 2. The oven may comprise a simple gas oven having a manifold 20 from which gas is burned in a combustion chamber separated from a heating chamber by a heat conductive wall 22. In this heating step the coating 16 is thoroughly fused or solvated at the pressure of the ambient atmosphere.

At the time the mandrel 10 is placed in the oven for the foregoing cure, there will be an excess of coating at the tips of the fingers of the mandrel and in the notches between the fingers, the excess being produced by the pull of gravity on the coating 16. During the heating step the coating 16 receives a gravitational pull in the opposite direction due to inversion of the mandrel 10 with the result that the excess at the fingertips and in the notches between the fingers is drawn downwardly of the glove and the coating 16 is smoothened to substantial thickness uniformity.

Following the heating step, the mandrel 10 with its coating 16 is withdrawn from the oven, permitted to cool, then dipped into a second plastisol 24 disposed in a suitable container 26 thereby producing a second coating 28 on the mandrel. After this second coating step the mandrel is again withdrawn from the plastisol and supported above the container 26 for a period of time sufficient to permit the excess plastisol coated on the mandrel to drop into the container 26.

Thereafter the mandrel with the second coating 28 thereon is inverted and returned to the oven 18 to thoroughly fuse or solvate the plastisol comprising the coating 28 at the pressure of the ambient atmosphere. During this fusion step the two coatings 16 and 28 firmly bond together.

After the second coating 28 has been cured, the mandrel 10 with the coatings 16 and 28 thereon is permitted to cool and the coatings, now in the form of a unitary glove, are stripped from the mandrel by pulling the cuff portion of the glove over the finger portions of the mandrel. This places the coating 28 in the interior of the glove. For reasons which become more apparent in the following, the glove is next turned inside out to place the coating 28 at the exterior of the glove. After trimming to any desired length, the glove is ready for use.

The coating 28 differs from the coating 16 in the primary respect that the coatings 28 contains a uniformly dispersed blow agent, that is, an additive which decomposes under the action of heat to release a gaseous matter into the body of the coating 28. As the coating 28 is cured, the gaseous matter released into the coating 28 produces gas pockets which roughen the surface of the coating 28 by raising blisters thereon.

The formulation of the second coating 28 is of decisive importance in the present invention. If the concentration of blow agent in the layer 28 is too great, a coating in the nature of a foamed lining is produced. A foamed lining is unacceptable for the present purposes since such a lining will interfere with the touch sensivity of the user of the glove. Thus a foamed lining will not accurately transmit the surface configuration of objects being handled to the fingers of the user. Furthermore, a foamed lining will act as a heat insulator destroying the ability of the user of the glove to gauge the temperatures of objects being handled. In other words, all objects being handled will seem to be warm since there will be only a limited heat conductivity through a foamed lining. For the purposes of the present invention, it is therefore required that the blow agent in the coating 28 be present in a concentration very much lower than that required to produce a foam.

A further important consideration is that the blow agent have a decomposition temperature sufficiently high that solvation or fusion of the plastisol comprising the coating 28 be close to completion before gaseous matter is released by the blow agent. If the blow agent should decompose before solvation is nearly complete, the coating 28 will be comparatively fragile such that bubbles of the gaseous material released by the blow agent will burst through the free surface of the coating 28 introducing a porosity into the coating, such as will enable the coating to pick up contaminating substances. Accordingly, the temperature at which fusion of the coating 28 occurs must be carefully adjusted with respect to the decomposition temperature of the blow agent.

In the preferred practice of this invention, the formulation for the inner coating 16 is a polyvinyl chloride plastisol formulation, as follows:

Example I

| | Parts by weight |
|---|---|
| Dioctyl phthalate plasticizer | 40 |
| Plastisol grade polyvinyl chloride resin (Geon 121 manufactured by B. F. Goodrich Co.) | 50 |
| Petroleum hydrocarbon (Conoco H 35 manufactured by Continental Oil Co.) | 5 |
| Stabilizer (organic cadmium) | 1 |

The plasticizer, stabilizer and petroleum hydrocarbon ingredients are mixed together in a suitable container and then the resin ingredient is aded slowly with continuous stirring until the resin is thoroughly wetted by the plasticizer and uniformly distributed therein. The blend is prepared at room temperature and maintained at a temperature below 130° F.

The foregoing blend, when applied to the mandrel 10 according to the procedures outlined above, produces a fused coating which is two to three mils thick. In the preferred practice of the invention the coating is heated for a period of about five minutes in an oven having a temperature of about 400° F. to fuse the same.

The preferred formulation for the outer coating 28 is a polyvinyl chloride plastisol including a blow agent such as follows:

Example II

| | Parts by weight |
|---|---|
| Dioctyl phthalate plasticizer | 40 |
| Plastisol grade polyvinyl chloride resin (Geon 121 manufactured by B. F. Goodrich Co.) | 55 |
| Petroleum hydrocarbon (Conoco H 35 manufactured by Continental Oil Co.) | 5 |
| Stabilizer (organic cadmium) | 1 |
| Blow agent (4,4'-oxybis-(benzene sulfonyl hydrazide)) | 0.01 |

The plasticizer, petroleum hydrocarbon, stabilizer and blow agent are mixed together in a suitable container and then the resin ingredient is added slowly with continuous stirring until the resin is thoroughly wetted by the plasticizer and uniformly distributed therein. The blend is prepared at room temperature and maintained at a temperature below 130° F.

For preparation of the coating 28 the mandrel 10, which has been removed from the oven after fusion of the coating 16 thereon, is permitted to cool to a temperature below 250° F. and then dipped into the foregoing plastisol blend for application of the coating 28 thereto. The viscosity of the blend of Example II is such that a coating of three to four mils thickness will adhere to the coating 16. When the coating 28 is subsequently fused in the oven 18 at a temperature of about 400° F. for a period of about five minutes, the evolution of gas upon decomposition of the blow agent will approximately double the thickness of the coating 28.

This increase in thickness results in part from an overall expansion of the layer due to the development of entrapped gas pockets in the interior of the coating. Those gas pockets which are immediately adjacent to the free surface of the coating 28 raise relatively well defined blisters or mounds at the free surface of the coating which further increase the approximate thickness of the coating. It is these blisters at the free surface of the coating which give the finally formed glove good traction in contact with objects being handled by the user.

Figure 5:
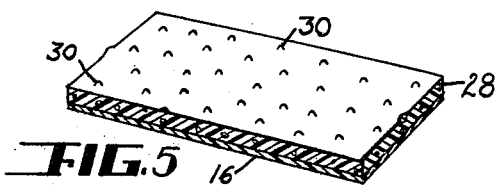
FIGURE 5 is a greatly enlarged fragmentary sectional view illustrating a molded sheet material produced by the present invention.

As appears in FIGURE 5, the blisters or mounds 30, while randomly spaced, are, in the majority of cases, separated by distances which are greater than the diameters of the individual blisters. This same condition obtains in the interior of the coating 28 with the result that the coating 28, while containing numerous spaced gas pockets, has many of the characteristics of a solid, unblown coating. Thus it is found that the presence of the gas pockets in the coating 28 does not significantly impair the heat transmission of that coating.

It is well understood in the art that the solvation or fusion temperature for a plastisol can be varied in a number of different ways. As examples, the fusion temperature is influenced by the nature of the plasticizer or plasticizers selected, and the ease with which the plasticizer enters into solution with the resin employed. Variations in the fusion temperature are also effected by adjustments in the relative proportions of plasticizer and resin, the introduction of fillers, and by preliminary heating techniques. It is also known to change the fusion temperature of the plastisol by the introduction of a solvent which delays fusion until evaporation or removal of the solvent.

By the employment of known techniques to vary the fusion temperature of the plastisol, it has been found possible to use a number of different types of blow agents, examples being the following:

Unicel (diazoaminobenzene)
Unicel ND (40% dinitrosopentamethylenetetramine and 60% inert material)
Porofor N (azobisisobutyronitrile)
Celogen AZ (azodicarbonamide)
Nitrozan (N,N'-dimethyl-N,N'-dinitrosoterephthalamide)
Sodium bicarbonate For preparation of a satisfactorily roughened surface on the coating 28, it is found that the concentration of blow agent in the plastisol of the coating 28 should be in the concentration range of from about 0.005 to about 0.05 weight percent based on the combined weight of the resin and plasticizer ingredients of the plastisol. In contrast, the concentration of blow agent which would produce a foam in a plastisol of the nature described in the example would be in the order of 3 weight percent based upon the combined weight of the resin and plasticizer ingredients.

At the upper limit of the concentration range set forth above (0.05 weight percent), easily observable blisters appear on the free surface of the blown glove layer. At the lower extreme, blisters can be observed at the free surface with the aid of a microscope. The result obtained at and near this lower extreme is particularly desirable since the glove, while not obviously roughened, has a dry and non-tacky feel, not present in unblown plastisol surfaces.

The glove prepared, as outlined in the foregoing, is characterized as the preferred embodiment of the present invention for the reason that the presence of the two coatings described results in a glove of the desired tensile strength, heat conductivity and surface texture. The glove is also found to provide the user with a desirable degree of tactile sensitivity. Due to the fact that the blow agent decomposition temperature has been adjusted to a level at or above the fusion temperature for the coating 28, bursting of gas bubbles through the free surface of the coating 28 is efficiently prevented with the result that the coating 28, while having a roughened surface, does not have a significant porosity such as would permit the accumulation of contaminating substances on the surface of the glove.

While the preferred embodiment suffices for numerous known applications, it is contemplated that applications will arise in which a need for greater tactile sensitivity and heat conductivity overrides the structural strength requirements. For such cases it is possible to eliminate the coating 16 and to apply the plastisol of Example II directly to the mandrel 10, so as to produce a single layer glove. When the plastisol of Example II is applied directly to the mandrel 10, a coating of three to four mils thickness is produced which upon fusion blows to a thickness of six to eight mils.

In the curing of this single layer glove, it is found that gelation and fusion occur at the surface of the mandrel 10 with sufficient rapidity that no observable amounts of gas escape to the interface between the plastisol coating and the mandrel 10. Thus the resulting glove has a smooth surface at that surface of the glove which was fused in contact with the mandrel 10. On the other hand, the free surface of this single layer coating is roughened by the formation of blisters or mounds thereon in the same manner as occurs in the previously described coating 28, the free surface appearing substantially as illustrated in FIGURE 5.

As in the preferred embodiment, the fusion of this single layer coating is accomplished by heating in an unpressurized oven such that the blisters or mounds form under the pressure of the ambient atmosphere.

In addition to the improved glove produced by the present invention, it will be recognized by those skilled in the art that numerous other applications for the present invention exist. An important benefit derived from the roughened surface produced herein is that the surface is non-tacky and dry to the touch. This characteristic greatly facilitates shipment and storage of the molded articles since blocking is retarded.

In gloves and related articles it is contemplated that some users will prefer to reverse the glove so that the roughened surface is to the interior of the glove. This facilitates insertion of one's hand into the glove since the skin slips freely over the roughened plastisol surface. Thus, for some users, the ease of donning the glove may override the superior traction and tactile sensitivity obtained by placing the roughened surface to the exterior of the glove.

Although the preferred embodiments of the device have been described, it will be understood that within the purview of this invention various changes may be made in the formulation of the various layers or coatings, the combination thereof and mode of operation, which generally stated consists in a process capable of carrying out the objects set forth, as disclosed and defined in the appended claims.

Having thus described my invention, I claim:

1. The method of producing a hollow molded article having one substantially smooth surface and one rough surface comprising the steps of applying a coating of creamy vinyl chloride resin plastisol to a mandrel having a shape corresponding to that of the article to be molded, fusing said coating by heat, applying to said mandrel a second coating overlying said first coating, said second coating comprising a creamy vinyl chloride resin plastisol including a resin dispersed in a plasticizer therefor and containing a chemical blow agent in a concentration range of from about 0.005 to 0.05 weight percent based on the combined weight of said resin and plasticizer ingredients, said blow agent having a decomposition temperature not substantially lower than the fusion at substantially atmospheric pressure said second coating in contact with said first coating by heating to a temperature exceeding the decomposition temperature of said blow agent whereby evolution of gas by said blow agent raises blisters on the free surface of said second coating.

2. The method of producing a hollow molded article having one substantially smooth surface and one rough surface comprising the steps of applying a coating of creamy vinyl chloride resin plastisol to a mandrel having a shape corresponding to that of the article to be molded, using said coating by heat, applying to said mandrel a second coating overlying said first coating, said second coating comprising a creamy vinyl chloride resin plastisol having a temperature less than 130° F., said plastisol including a resin dispersed in a plasticizer therefore and containing a chemical blow agent in a concentration range of from about 0.005 to 0.05 weight percent based on the combined weight of said resin and plasticizer ingredients, said blow agent having a decomposition temperature not substantially lower than 400° F. and said plastisol of said second coating having a fusion temperature not substantially higher than 400° F., and fusing at substantially atmospheric pressure said second coating in contact with said first coating by heating to a temperature exceeding the decomposition temperature of said blow agent whereby evolution of gas by said blow agent raises blisters on the free surface of said second coating.

3. The method of producing a hollow molded article having one substantially smooth surface and one rough surface comprising the steps of providing a mandrel having a substantially smooth and non-porous surface the shape of which corresponds to that of the article to be molded, applying to said mandrel a coating of creamy vinyl chloride resin plastisol approximately two to three mils thick, fusing said coating by heat, applying to said mandrel a second coating approximately three to four mils thick overlying said first coating, said second coating comprising a creamy vinyl chloride resin plastisol including a resin dispersed in a plasticizer therefor and containing a blow agent in the concentration range of from about 0.005 to 0.05 weight percent based on the combined weight of said resin and plasticizer ingredients, said chemical blow agent having a decomposition temperature not substantially lower than the fusion temperature of the plastisol of said second coating, and fusing at substantially atmospheric pressure said second coating in contact with said first coating by heating to a temperature exceeding the decomposition temperature of said blow agent whereby evolution of gas by said agent raises blisters on the free surface of said second coating.

4. The method of producing a glove having one substantially smooth surface and one rough surface comprising the steps of providing a mandrel having finger portions corresponding to the shape of a hand, applying a coating of creamy vinyl chloride resin plastisol approximately two to three mils thick to the exterior surface of said mandrel by dipping said mandrel into a container for said plastisol, supporting said mandrel with the finger portions thereof directed downwardly to allow excess plastosol to drip from said finger portions, inverting said mandrel so that the finger portions thereof are directed upwardly and in such position fusing said coating of plastisol by an application of heat thereto, applying to said mandrel a second coating approximately three to four mils thick overlying said first coating, said second coating comprising a creamy vinyl chloride resin plastisol including a resin dispersed in a plasticizer therefor and containing a chemical blow agent in a concentration range of from about 0.005 to 0.05 weight percent based on the combined weight of said resin and plasticizer ingredients, said blow agent having a decomposition temperature not substantially lower than the fusion temperature of the plastisol of said second coating, supporting said mandrel with the finger portions thereof directed downwardly to allow excess plastisol to drip from said second coating, inverting said mandrel so that the finger portions thereof are directed upwardly and in such position fusing at substantially atmospheric pressure said second coating by application of heat thereto to raise the temperature of said coating to a temperature exceeding the decomposition temperature of said blow agent whereby evolution of gas by said blow agent raises blisters on the free surface of said second coating, said fusion of said first and second coatings with said mandrel in said inverted positions producing a unitary layer of substantially uniform thickness on said mandrel.

References Cited

UNITED STATES PATENTS

| | | | |
|---|---|---|---|
| 2,997,746 | 8/1961 | O'Brien et al. | 264—48 |
| 3,200,176 | 8/1965 | Baxter | 264—328 |

OTHER REFERENCES

Bender, Rene J. et al., Handbook of Foamed Plastics, Libertyville, Ill., Lake Publishing Corp., 1965 (Arnold J. Werner) (pp. 297–298 relied on).

It's Done with Plastisols, Modern Plastics, December 1951, (pp. 87 and 92 relied on).

JULIUS FROME, Primary Examiner

LEON GARRETT, Assistant Examiner

U.S. Cl. X.R.

264—054, 299, 305